(No Model.) 7 Sheets—Sheet 1.
R. SOLANO.
VALVE FOR MOTORS.

No. 424,660. Patented Apr. 1, 1890.

Witnesses
Renaldo Solano
Inventor (No Model.)  R. SOLANO.  7 Sheets—Sheet 3.
VALVE FOR MOTORS.

No. 424,660.  Patented Apr. 1, 1890.

Witnesses  Inventor
Renaldo Solano.
By Foster & Freeman
Attorneys (No Model.)
7 Sheets—Sheet 4.
R. SOLANO.
VALVE FOR MOTORS.
No. 424,660.
Patented Apr. 1, 1890.
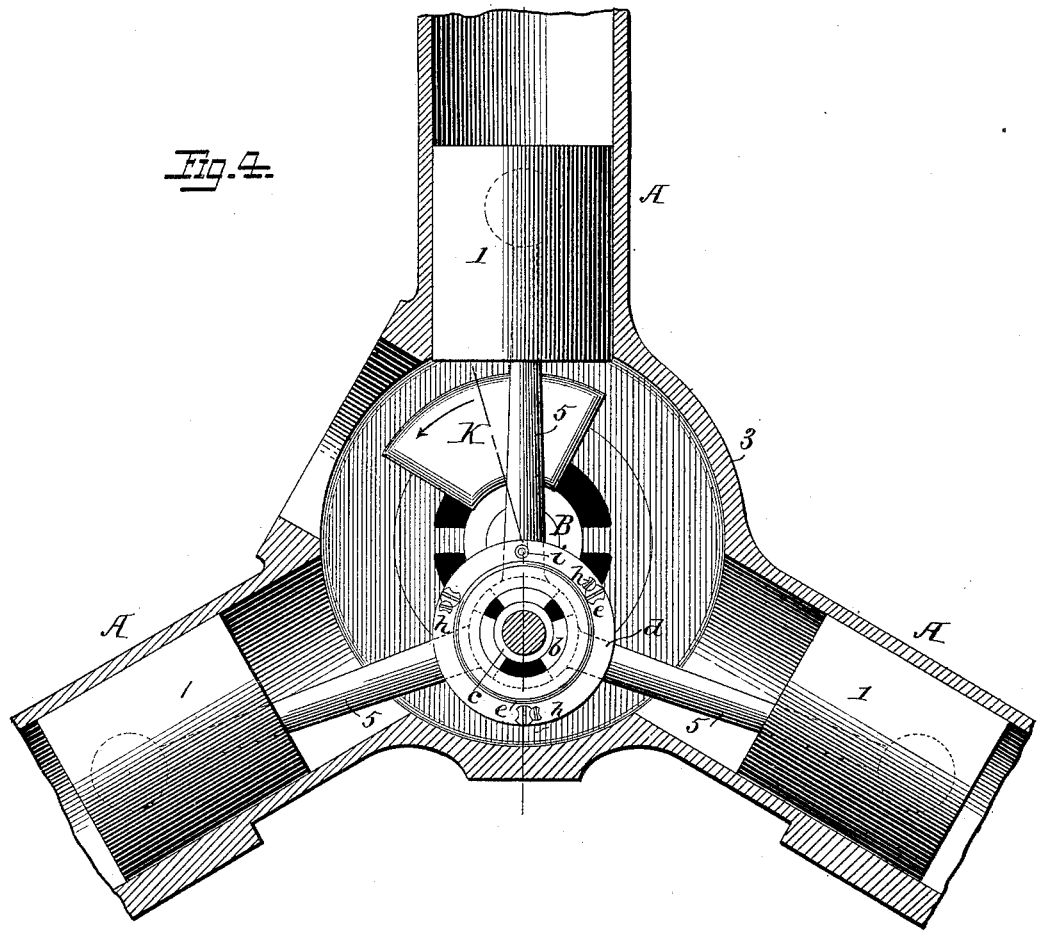
Witnesses
Jno. G. Hinkel Jr.
W. S. McArthur
Renaldo Solano
Inventor
By Foster & Freeman
Attorneys

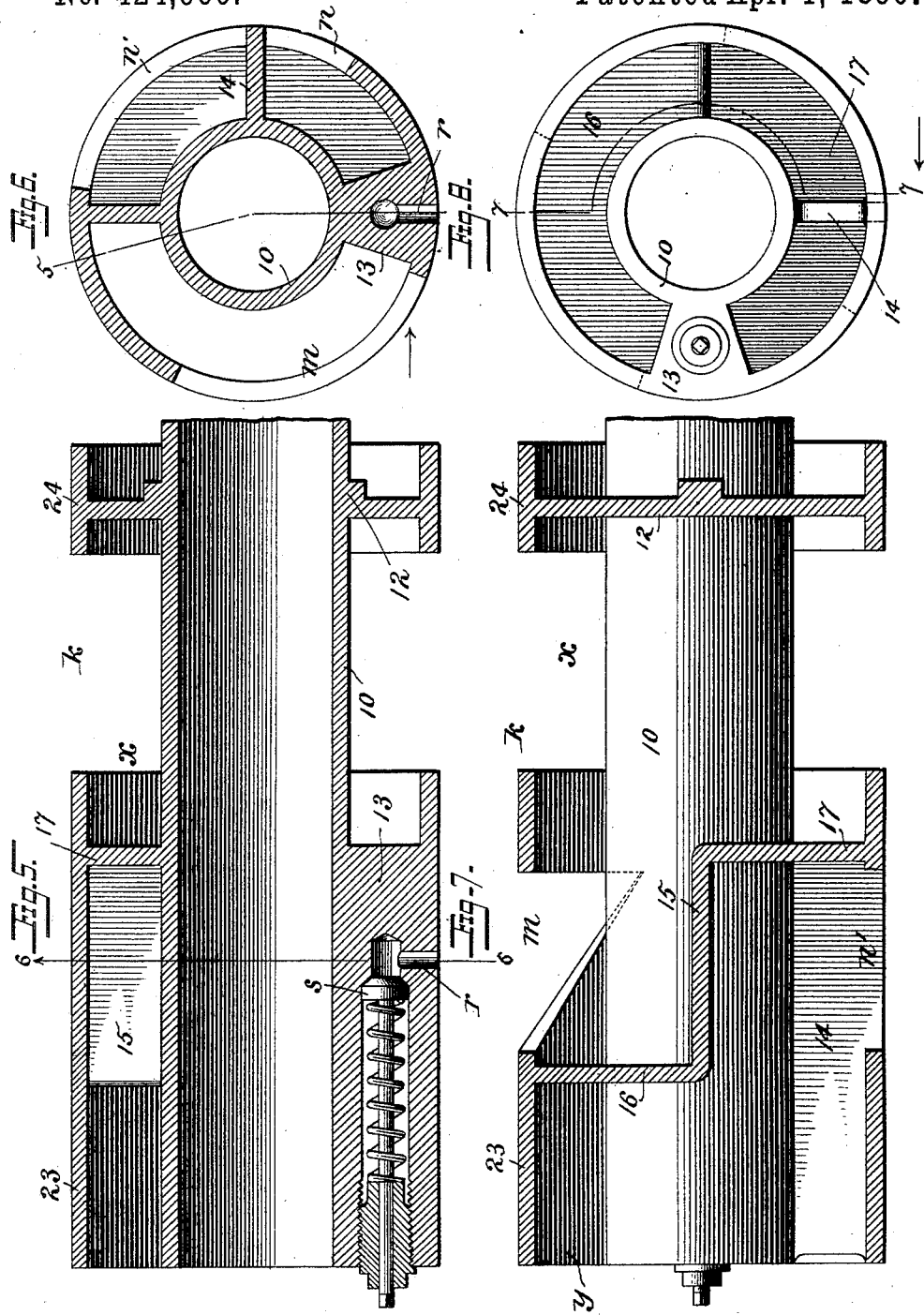

(No Model.) 7 Sheets—Sheet 6.

R. SOLANO.
VALVE FOR MOTORS.

No. 424,660. Patented Apr. 1, 1890.

Witnesses
Jno. G. Hinkel Jr.
W. S. McArthur

Renaldo Solano
Inventor

By his Attorneys
Foster & Freeman (No Model.) 7 Sheets—Sheet 7.
R. SOLANO.
VALVE FOR MOTORS.
No. 424,660. Patented Apr. 1, 1890.
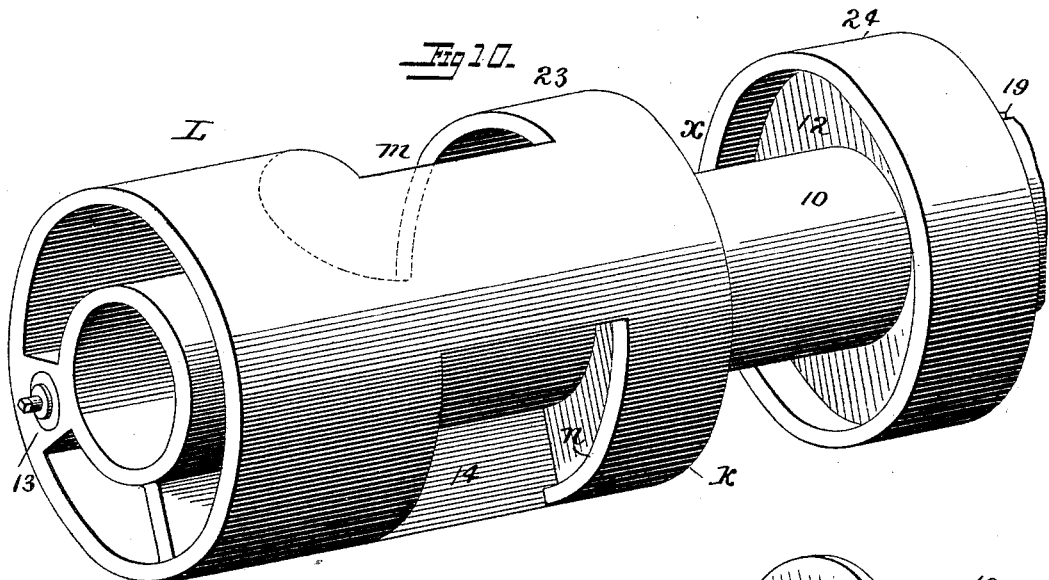
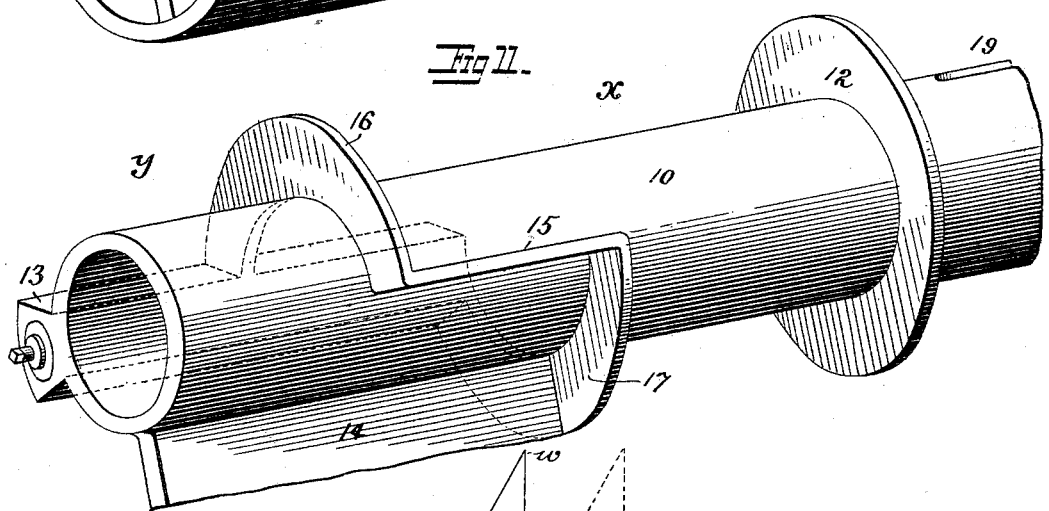
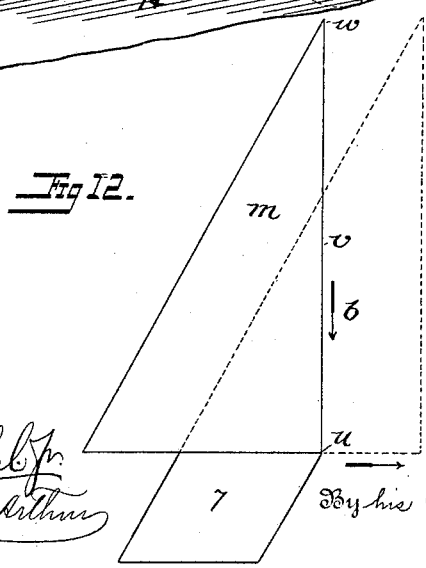
Witnesses
Jno. G. Hinkel Jr.
W. S. McArthur
Renaldo Solano
Inventor
By his Attorneys
Foster & Freeman

UNITED STATES PATENT OFFICE.

RENALDO SOLANO, OF BROOKLYN, NEW YORK, ASSIGNOR OF THREE-FOURTHS TO JOHN W. HOWARD AND DAVID R. MORSE, OF SAME PLACE, AND LUCIUS G. FISHER, OF CHICAGO, ILLINOIS.

VALVE FOR MOTORS.

SPECIFICATION forming part of Letters Patent No. 424,660, dated April 1, 1890.

Application filed April 19, 1889. Serial No. 307,697. (No model.)

*To all whom it may concern:*

Be it known that I, RENALDO SOLANO, a citizen of the United States, residing in Brooklyn, Kings county, New York, have invented certain new and useful Improvements in Valves for Motors, of which the following is a specification.

This invention relates to steam or other motors having a plurality of single-acting cylinders radially arranged; and the invention consists in the construction of the engine, valve, and other parts whereby to secure greater efficiency, economy, and cut off the motor-fluid automatically, as may be desired.

Figure 1:
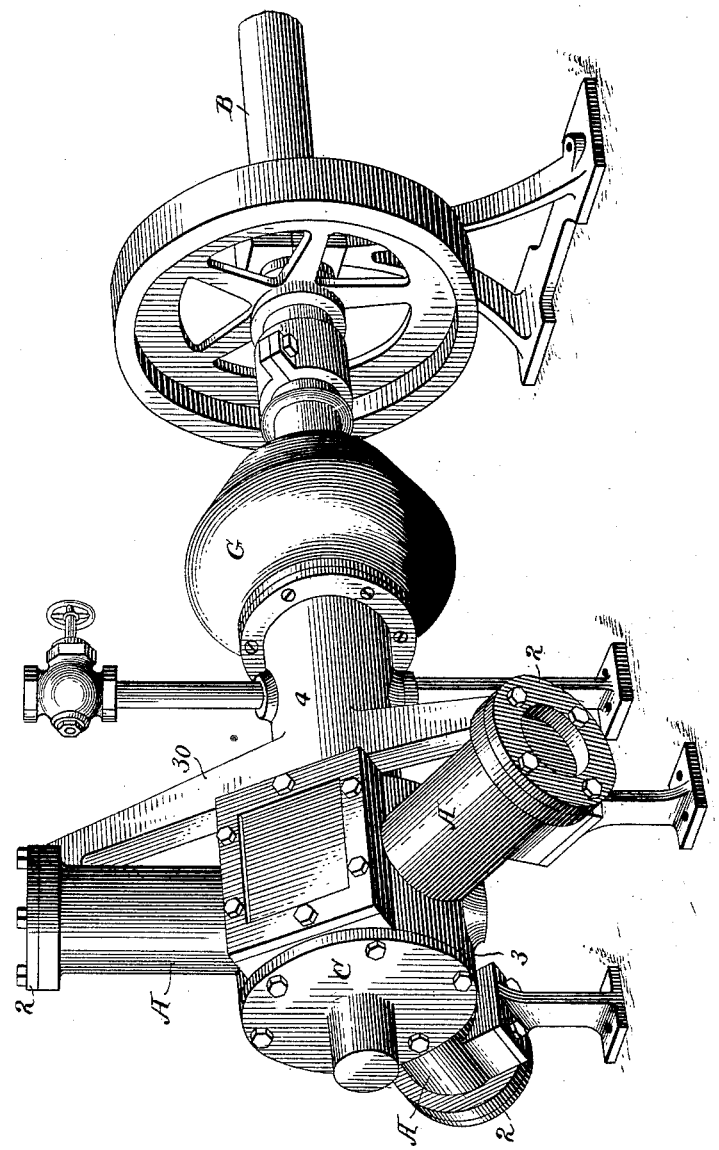
Figure 2:
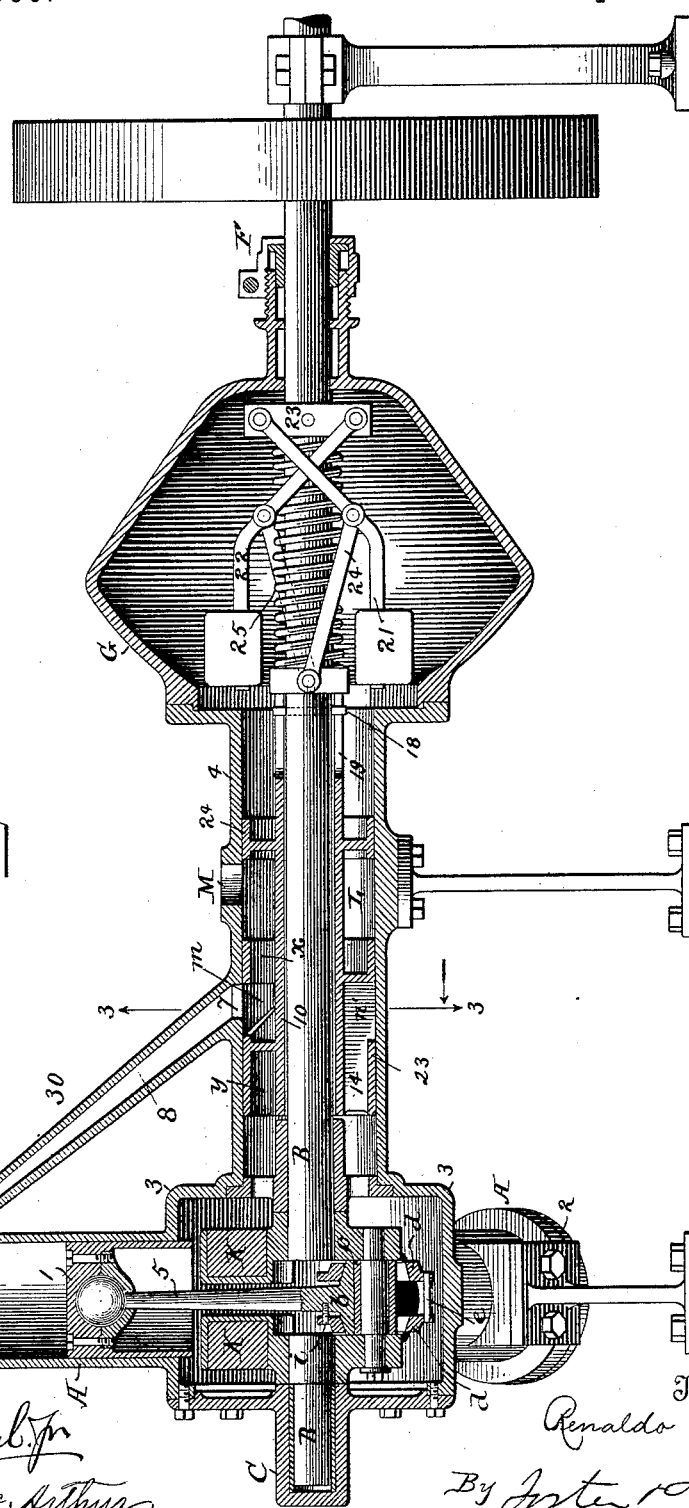
Figure 3:
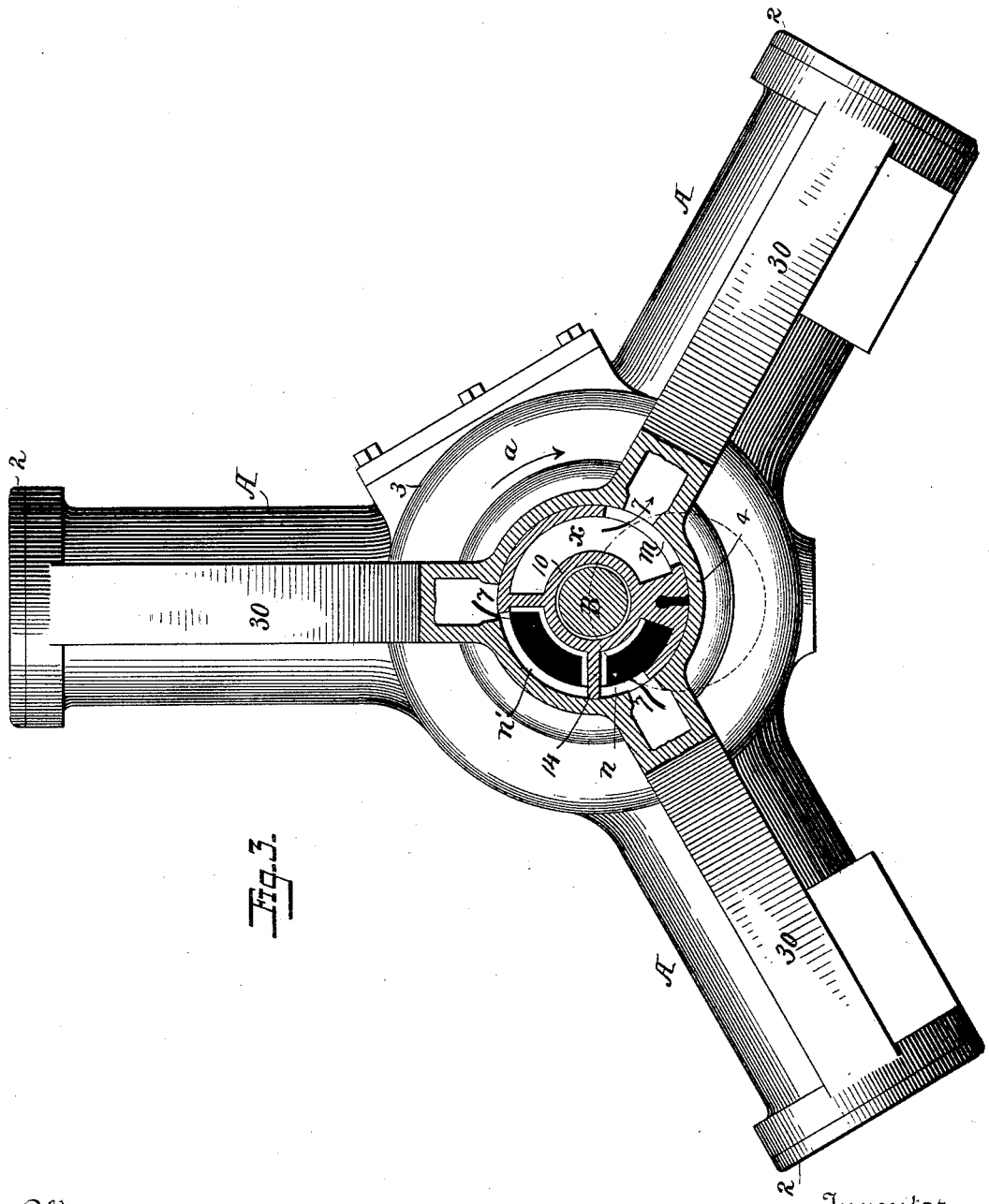
Figure 9:
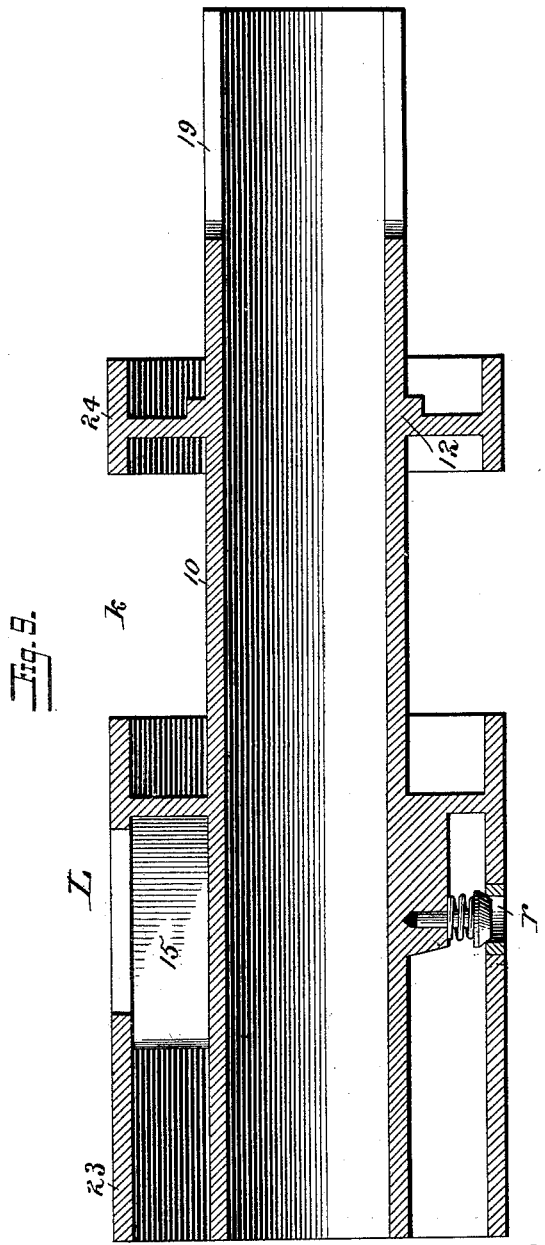

In the accompanying drawings, Figure 1 is a perspective view of my improved multiple motor. Fig. 2 is a longitudinal sectional elevation. Fig. 3 is a sectional elevation on the line 3 3, Fig. 2, looking in the direction of the arrow. Fig. 4 is a transverse section through the cylinders and connecting-chest. Fig. 5 is a section on the line 5, Fig. 6, looking in the direction of the arrow. Fig. 6 is a section on the line 6 6, Fig. 5. Fig. 7 is a section on the line 7 7, Fig. 8. Fig. 8 is a section on the line 8 8, Fig. 7. Fig. 9 is a longitudinal sectional view illustrating a modification. Fig. 10 is a perspective view of the valve. Fig. 11 is a perspective view of the valve, the outer cylindrical sections detached. Fig. 12 is a diagram.

The improved engine may embody any desired number of cylinders and pistons, the construction illustrated in the drawings having three radial cylinders $a$, each provided with a piston 1, of trunk form, the outer end of each cylinder being provided with a head 2 and the inner end being open and communicating with, and peferably cast in one piece with, a chest 3, which is closed by a cap C at the forward end, while a cylindrical trunk or extension 4 projects from the opposite end, and in suitable bearings in the trunk and head turns the crank-shaft B. The shaft B is in two sections, to the inner ends of which, within the casing 3, are secured crank-arms J, Fig. 2, supporting the crank-pin I, the arms and crank-pin, together with the connected parts, being counterbalanced by weighted projections K K, the counter-balance being at one side of the radial line of the crank and toward that side toward which the counter-balance travels, as illustrated in Fig. 4, thereby securing a better counterbalancing effect and a more even movement than results when the counter-balance is directly in line with the crank.

Each piston-rod 5 is connected with the piston by a ball-and-socket joint, and has at its inner end a head $b$, the face of which is curved to correspond to that of a sleeve $c$ upon the crank-pin, and the edges of the head are beveled to correspond to the beveled or recessed faces of two disks $d$ $d$, which are clamped upon the heads by means of transverse screws $e$, each of which is provided with a notched head $e'$, whereby it may be locked in any position to which it is turned by means of an ordinary locking-screw $h$, Fig. 4. By turning the bolts $e$ the disks $d$ are adjusted to bear snugly, but without undue friction, against the heads of the connecting-rods, between which there is room for the requisite amount of play to and from each other. A pin $i$, projecting through a slot in one of the disks $d$, prevents the latter from turning upon the heads $b$.

Each of the cylinders $a$ is provided with a port 6 near the outer end, which serves both as an inlet and exhaust port, and which communicates with a port 7 in the trunk 4 through a channel 8, the ports 7 being at equal distances from each other in the same transverse plane, and the admission and exhaust of the steam being controlled by means of a valve L, turning in the trunk 4. While the valve L may be of any suitable form and operate in any desirable way to control the admission of the steam to the ports 7 and its passage therefrom, I prefer the construction illustrated in the drawings, in which said valve consists of a sleeve 10, Figs. 2, 10, and 11, through which the shaft B passes without contact, and two cylindrical portions 23 24, surrounding said sleeve, the portion 24 being connected thereto by a flange or partition 12, while the portion 23 is connected to the sleeve through the medium of three longitudinal partitions 13, 14, and 15 and two transverse semicircular partitions 16 and 17, the partition 16 extending from one side of the partition 13 to the front end of the partition 15, and the partition 17 extending from the inner end of the partition 15 and across the inner end of the partition 14 to the opposite side of the partition 13, as best shown in Fig. 11. By means of these partitions the valve is divided into practically two main chambers $x$ and $y$, the former communicating with a circumferential port $k$, which always coincides with the steam-inlet port M, and in the cylindrical portion 23 of the valve is a steam-admission port $m$, which extends nearly half-way around the valve and is triangular in shape, as shown, and an exhaust in two sections or ports $n\ n'$, Figs. 3 and 12, being divided into the two portions by the partition 14, which subdivides the chamber $y$ longitudinally, for a purpose described hereinafter.

The valve L, without being secured to the shaft B, is carried with it in its revolution by any suitable intermediate connections—for instance, by means of a key 18, Fig. 2, extending through the shaft and into longitudinal slots 19 in the sleeve 10. I find in practice that by driving the valve from the shaft without any rigid connection between them I prevent the uneven wear of the valve which would occur from the springing or displacement of the shaft if the two were rigidly connected. The steam or other motor-fluid passes through the port M of the casing and the port $k$ of the valve into the chamber $x$, and as the valve revolves in the direction of the arrow $a$, Fig. 3, the port $m$ is brought in succession to the different ports 7, and the steam passes from the chamber $x$ successively to the cylinders and forces inward the pistons one after the other, thereby imparting the desired rotation to the crank-shaft through the medium of the piston-rods and cranks. After the port $m$ has passed from opposite one of the ports 7 and the blank portion of the valve closes said port the port $m$ begins to coincide with the next port 7 of the next cylinder, while the portion $n'$ of the exhaust-port, Fig. 3, is brought to coincide with the port 7, from which the steam has been cut off. The steam now passes into the chamber $y$ through the port $n'$ and out of the open end of the valve into the casing 3, from which it is discharged through the exhaust-pipe 20, Fig. 1. By interposing the partition 14 between the two sections $n\ n'$ of the exhaust-port the steam at a higher pressure exhausting from one cylinder at the beginning of the upstroke—as, for instance, the upper cylinder, as shown in Fig. 3—is prevented from obstructing the exhaust which is taking place at the same time from another cylinder already partially exhausted, and back-pressure is thus prevented. With the parts constructed and operated as above described the steam is cut off uniformly from all the cylinders and at all speeds at the same point in the stroke of each piston.

In order to secure the advantages of a variable cut-off with a multiple engine and to avoid the disadvantages which would result from employing a series of cut-off valves, I make the valve L, in addition to its usual functions, perform also the functions of a variable cut-off, which effect I secure by properly constructing the ports and by changing the longitudinal position of the valve according to the speed of the engine. Thus each port 7 is of a diamond or lozenge shape in plan, as illustrated in Fig. 12, and the port $m$ of the valve is wider and longer than the port 7, the portions most effective being illustrated in the plan diagram, Fig. 12, so that as the valve turns in the direction of the arrow $b$, Fig. 12, with the edge $v$ of the port $m$ on line with the corner $u$ of the port 7 the steam will follow the piston for nearly the entire length of the stroke, as the port 7 will not begin to close until one-half of the port $m$ has passed beneath it, the complete closing only being effected as the point $w$ of the port $m$ passes the corner $u$ of the port 7. If, however, the valve, owing to any increase in the speed of the engine, is moved to the right by any suitable governor or regulator toward the position shown in dotted lines, Fig. 11, the port $m$ will begin to be obstructed from the moment it first begins to coincide with the port 7, and the steam-passage will gradually contract during the entire movement of the valve and will be wholly closed by the time about one-half the length of the port $m$ has passed the point $u$.

Different regulating or governing devices may be employed for thus shifting the position of the valve L; but I have shown one arrangement which has proved effective, the same consisting of a ball-governor S, Fig. 2, upon the shaft B, within an enlargement of the trunk 4, constituting a casing G, which casing is provided at the outer end with a recessed collar for receiving a packing that is compressed by a gland F. The weighted arms 21 22 of the governor cross each other and are pivoted to a cross-piece 23 upon the shaft B, and are connected by links 24 with a collar R, sliding upon the shaft and connected to the sleeve 10 of the valve, a spring 25, between the cross-piece 23 and the collar, thrusting the valve to the left, while the separation of the arms 21 22 upon any increase in the speed of the engine draws the valve to the right and cuts off at an earlier point in the stroke.

It will be obvious that the ports may be constructed in different ways, according to the character of the valve and of the engine, that the construction and arrangement of the valve may be varied, and that it may be operated by any of the usual forms of speed governors or regulators.

At some portion of the valve-seating surface, which succeeds the exhaust-openings in passing the cylinder-ports—for instance, in the partition 13—is a port $r$, Figs. 5 and 6, controlled by a relief-valve $s$. The valve $s$ is made, preferably, in the form of a puppet-valve retained on its seat by a spring, and the port $r$ is so placed that should the cushioning or compression of the steam between the piston and the head of the cylinder at any time become excessive, or should condensed steam or other liquid accumulate in the cylinder, either fluid may pass to said port *r* and escape by the automatic opening of the valve, which is weighted, so as not to rise unless the desired cushioning-pressure is exceeded. By this means I prevent the disastrous results which might otherwise arise from the confinement of the fluid between the piston and the cylinder-head. By weighting the valve to prevent the escape of the steam, except when the pressure is excessive, each piston is cushioned as it approaches the limit of its outward movement—an important result in high-speed engines, thereby reducing the vibrations incident to high speed and reducing the wear of the parts. The amount of cushioning which it is practicable to employ with safety may be materially increased when a relief-valve is employed, and by varying the pressure of the spring of the relief-valve the amount of the cushioning may be regulated to any desired extent. By placing the relief-valve in the main valve L a single relief-valve regulates the cushioning of all the pistons; but if desired each cylinder may be provided with a separate relief-valve. A different construction from that described and illustrated in the other figures is shown in Fig. 9. It will be seen that the channels 8 are in radiating-arms 30, between the trunk 4 and the cylinders, whereby such arms serve also as braces to strengthen the frame of the engine.

Although I have referred to steam as the motor-fluid, it will be evident that water, compressed air, or other fluid may be substituted therefor.

It will be evident that many of the features in the machine above described may be varied without departing from the main features of the invention, and I contemplate such changes and modifications, not only those indicated in the specifications, but others.

Without, therefore, limiting myself to the precise construction and arrangement of parts shown, I claim—

1. A multiple-cylinder engine provided with a series of ports communicating each with one of the cylinders, and a valve divided to form inlet and exhaust chambers, the latter subdivided longitudinally, the valve having a port *m*, in constant communication with the supply-port, and two ports *n n'*, communicating in succession with the exhaust, substantially as set forth.

2. A multiple-cylinder engine provided with a series of ports 7, each of a lozenge or diamond shape, a valve having chambers and ports *m n n'*, the port *m* communicating with the supply-port, and being triangular in shape and arranged to be carried to and from the ports 7 in succession, substantially as set forth.

3. A multiple engine having radiating-cylinders communicating with a casing 3, a trunk also communicating with said casing, and provided with lozenge-shaped ports each communicating with one of the cylinders at its outer end, and a cylindrical valve revolving in the trunk and provided with chambers and with ports, one triangular in shape, to control the admission of steam to and from the said cylinders, substantially as set forth.

4. The combination, with the cylinders of a multiple engine and with the ports thereof, of a revolving cylindrical valve provided with an inlet-port and with an outlet-port separated by partitions 13 14 15 16 17, substantially as and for the purpose set forth.

5. The combination, with the cylinders, driving-shaft, and casing of a multiple engine, of a valve controlling the flow of steam to and from the cylinders, concentric with the shaft without bearing thereon, and connected therewith, to be driven thereby, substantially as set forth.

6. The combination, with the rotary cylindrical valve of a multiple engine, of a driving-shaft supported by the frame of the engine at opposite ends, and extending through said valve without bearing thereon, and connected to drive said valve by interlocking connections, substantially as set forth.

7. The within-described cylindrical induction and exhaust valve for multiple engines, provided with an admission and an exhaust port, succeeding each other in the periphery of the valve, with a sleeve 10, for the passage of the crank-shaft through the valve, and with a partition separating the admission from the exhaust port, substantially as set forth.

8. The valve L, consisting of the cylindrical outer section 23 and 24, the concentric inner sleeve 10, the ports *m n n'*, and partitions 13, 14, 15, 16, and 17, substantially as set forth.

9. The combination of the crank-pin and connecting-rods having heads separated from each other and with beveled edges and corresponding beveled disk, substantially as set forth.

In testimony whereof I have signed my name to this specification in the presence of two subscribing witnesses.

RENALDO SOLANO.

Witnesses:
FRED. C. KELLER,
FRED R. MORSE.